July 26, 1960
P. H. NAST
2,946,314
ROCK DRILLS
Filed Sept. 1, 1955
3 Sheets-Sheet 1
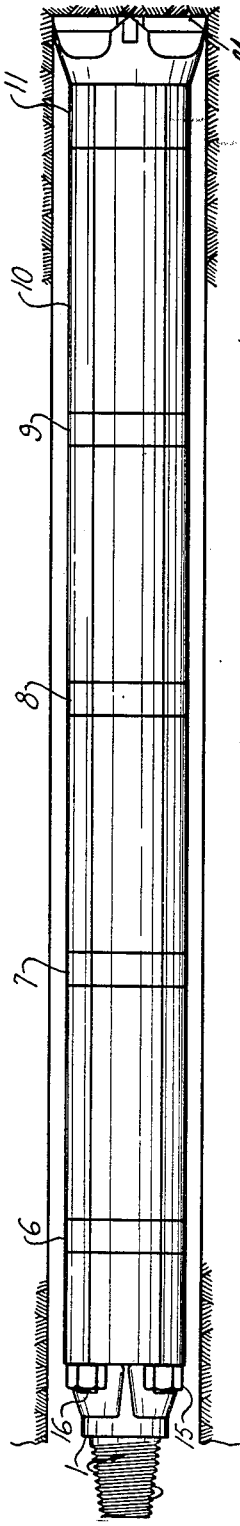
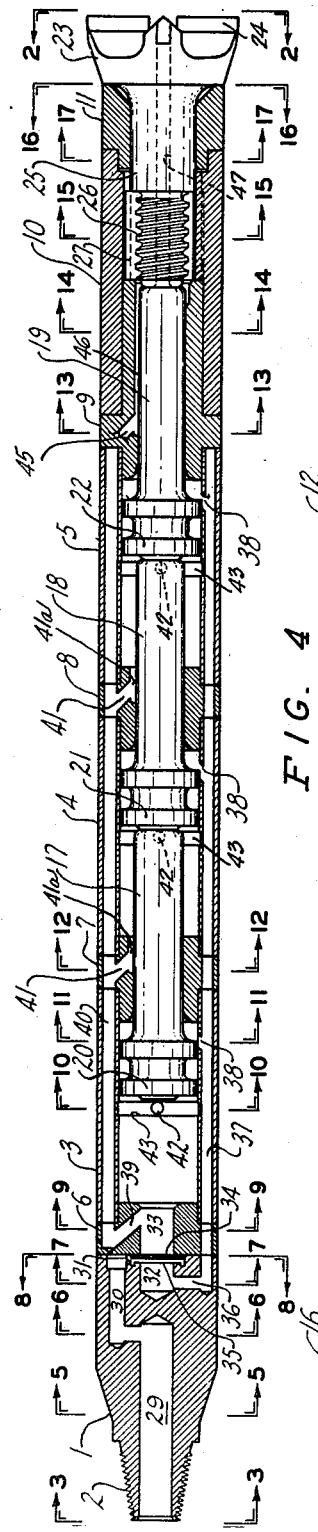
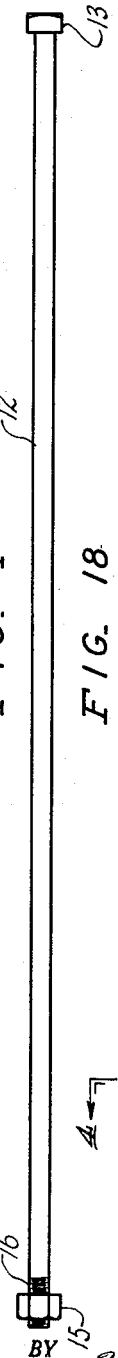
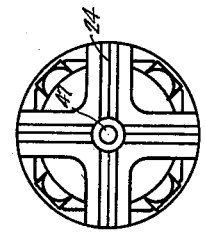
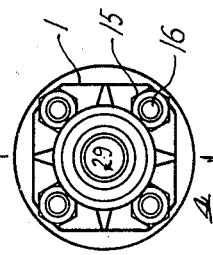
INVENTOR.
Paul H. Nast
BY William B. Jaspert
Attorney.

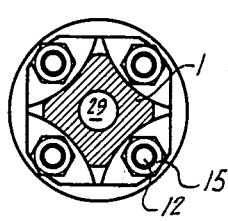
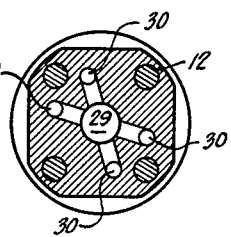
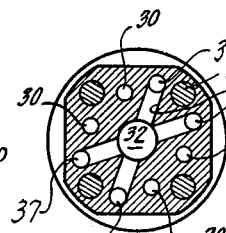
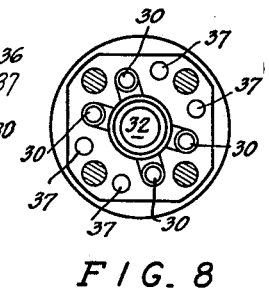
FIG. 5   FIG. 6   FIG. 7   FIG. 8
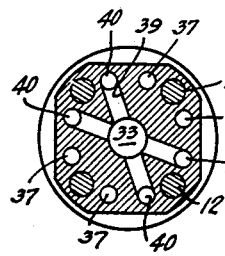
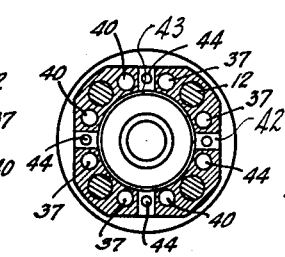
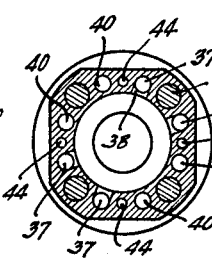
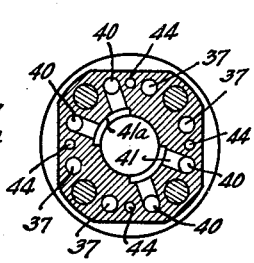
FIG. 9   FIG. 10   FIG. 11   FIG. 12
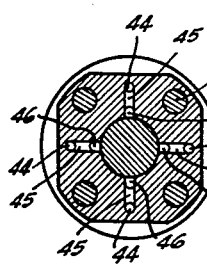
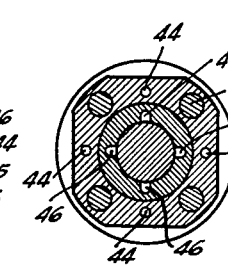
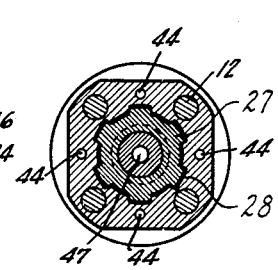
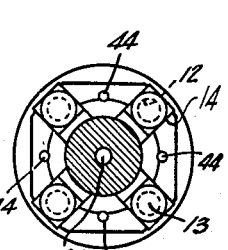
FIG. 13   FIG. 14   FIG. 15   FIG. 16
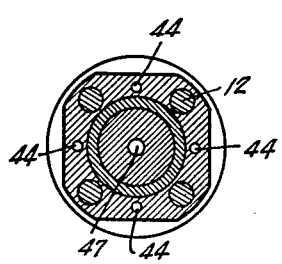
FIG. 17
INVENTOR.
Paul H. Nast
BY William B. Jaspert
Attorney.

July 26, 1960

P. H. NAST 2,946,314

ROCK DRILLS

Filed Sept. 1, 1955

INVENTOR.
Paul H. Nast
BY William B. Jaspert
Attorney.

United States Patent Office 2,946,314
Patented July 26, 1960

2,946,314
ROCK DRILLS
Paul H. Nast, 1632 Highbridge Road, Cuyahoga Falls, Ohio
Filed Sept. 1, 1955, Ser. No. 532,055
4 Claims. (Cl. 121—15)

This invention relates to new and useful improvements in rock drills, more particularly drills employed with rotary drilling equipment to which the drills are attached for rotary motion, and it is among the objects thereof to provide a rock drill in which the drill bit is actuated by a fluid pressure acting upon piston hammers which may be employed in multiples in axially joined cylinders and in which the piston hammers may be operated as individual units in synchronism or as integrally joined members.

Another object of the invention is the provision of a rock drill of the rotary type of the above designated character in the form of a simple, compact unit that is adapted to be submerged in the hole which it drills and in which the pressure fluid employed for actuating the piston hammers is ported through the bit and/or cylinder walls for blowing out the rock cuttings.

It is still a further object of the invention to provide a rock drill employing multiple piston hammers utilizing a composite housing structure that includes the back head, the piston cylinders, a chuck housing and a housing cover joined by rods, the said enumerated parts being readily machinable prior to their assembly as a drill unit.

It is still a further object of the invention to provide a piston operated rock drill in which the air pressure to opposite sides of the piston heads is controlled by a single valve and in which the separate piston hammers are synchronized in their reciprocatory movement by means of a pressure differential maintained on the front and rear sides of the piston to render them movable simultaneously.

These and other objects of the invention will become more apparent from a consideration of the accompanying drawings, constituting a part hereof, in which like reference characters designate like parts, and in which—

Fig. 1 is a side elevational view of a rock drill embodying the principles of this invention, shown submerged in a drilled hole;

Fig. 2 is an end elevation of the bit;

Fig. 3 is an end elevation of the drill shank or back head;

Fig. 4 is a cross-sectional view, partially in elevation, taken along the line 4—4 of Fig. 3;

Figure 19:
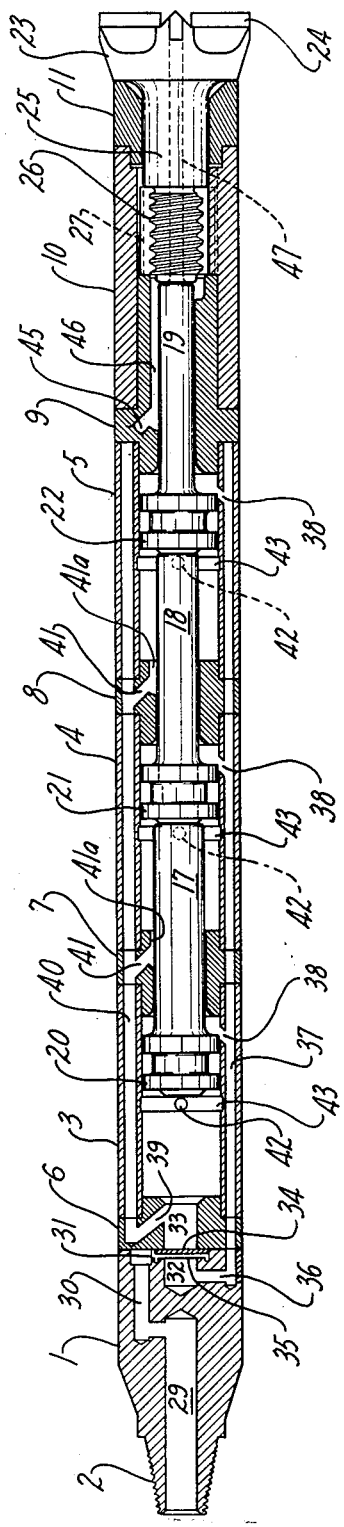

Figs. 5 through 17 are cross-sectional views taken along the lines 5—5 through 17—17, shown in Fig. 4 of the drawings;

Fig. 18 is a side elevational view of a tie rod or connecting bolt; and

Figure 19 is a cross-sectional view, partially in elevation, corresponding to the view of Figure 4, but showing the piston stems 17, 18 and 19 of different diameters.

With reference to Fig. 4 of the drawings, the numeral 1 designates a back head or what may be termed the shank of the drill unit having a threaded portion 2 for engagement with a rotary drill pipe, not shown. A plurality of cylinders 3, 4 and 5, a valve box 6 and cylinder heads 7 and 8, a chuck housing stem 9, a chuck housing 10 and a chuck housing cover 11 are assembled in end-to-end relation, as shown, and are joined or held together by rods 12 having square heads 13 that fit in slots 14, Fig. 16 of the drawings, in the chuck housing cover 11 and extend through the described parts and are fastened by nuts 15 at the threaded end 16 of the rods 12, as shown in Fig. 1.

Disposed in the cylinders 3, 4 and 5 are piston hammers having stems 17, 18 and 19 having heads 20, 21 and 22, respectively, the piston heads being slidably mounted for reciprocatory movement in the cylinders 3, 4 and 5. The piston stems 17, 18 and 19 are of graduated diameter, stem 17 being larger than stem 18 which latter, in turn, is larger than the stem 19 and with the piston heads 20, 21 and 22 all of the same size, the difference in the diameter of the stems 17, 18 and 19 effects a corresponding difference in the area of the piston head with which they connect. That is to say, the front area of piston 20 to which stem 17 connects is smaller than the corresponding areas of pistons 21 and 22, the area of piston 22 being the smaller. This effects a pressure differential between the respective pistons useful in a manner to be hereinafter explained.

The drill bit, designated by the reference numeral 23, is provided with the customary cutting teeth 24 and a shank portion 25 that is slidingly mounted in the cover 11 of the chuck housing 10. The end of the bit shank 25 is threaded, as shown at 26, the threaded portion interacting with the thread of a spline nut 27, also shown in Fig. 15 of the drawings, which is free to reciprocate in slots or grooves 28 provided in the chuck housing 10 without revolving except with the drill housing. The bit 23 is assembled by simply turning it and threading it into the nut 27. As shown in Fig. 4, the respective piston hammers and bit shank are in abutting engagement which is maintained during the operation of the rock drill, as will be hereinafter explained.

Fluid pressure is supplied to actuate the piston elements through the passage 29 in the center of the shank, passage 30 leading to a valve chamber 31 that communicates with a drill hole 32, and a passage 33 in the cylinder front head 6. A disc valve 34 is adapted to abut valve box 6 to seat thereon as shown, or in its other position, to abut the seat 35 in the shank portion 1. The drill hole 32 is connected by a passage 36 with passages 37, of which there are four, as shown in Figs. 7 through 12, the passages 37 communicating with the cylinder chambers through ports 38. The passage 33, on the other side of the valve 34, is connected by the passage 39 with fluid pressure passages 40, of which there are four, as shown in Figs. 9 through 12 of the drawings, the latter being connected by ports 41 and 41a in the cylinder heads 7 and 8. The chuck housing stem 9 is provided with four passages 45 that register with grooves 46, Figures 4, 13 and 14 leading to a center hole 47 that extends to the end of the drill bit 23. Cylinders 3, 4 and 5 are provided with exhaust ports 42, Fig. 4, located in exhaust grooves 43 that are also shown in Fig. 10 which are connected by passages 44 with the passages 45, as shown in Fig. 13, to direct the exhaust expanding pressure fluid from cylinders 3, 4 and 5 to the center hole 47 to blast the cuttings from the end of the drill bit 23 to the surface end to prevent their plugging the space between the drill bit and the cover 11.

The operation of the above-described rock drill mechanism is briefly as follows:

With the valve 34 abutting the valve box 6, as shown in Fig. 4 of the drawings, air supplied through the passage 29 passes into the valve chamber 31 and to the lefthand side of the disc 34, as viewed in Fig. 4, to passages 36 from which it enters ports 38 at the forward end of pistons 20, 21 and 22 and causes displacement of the pistons toward the left, as viewed in the drawings. As the piston heads cover the exhaust grooves 43, the air between the piston heads and cylinder heads will be compressed as the pistons move rearward until it is of a force to unseat the disc valve 34. At that time, the pressure is in excess of the pressure in passage 29 which will cause a pulsation at the end of the stroke due to the cushion effect of the air built up by compression. This pulsation stops the pistons and starts them moving in a reverse direction. Valve 34 being unseated or rather displaced against the seat 35, air will pass from valve chamber 31 through passage 33, passage 39 to the port passages 40 and act upon the piston heads simultaneously, pressure being equal in all of the cylinder chambers. The piston hammers will then continue to travel toward the right or forward end to act upon the cutting bit stem, 25 to impart an impact blow on the cutting face of the bit. Because the head of piston 20 is entirely exposed due to the absence of the piston stems that act upon the heads 21 and 22, greater force will be asserted by the piston 20, which causes it to maintain contact with the head 21 and through the piston stem 18 with the head 22 of the end piston.

Upon return movement, the compression force in cylinder 5 on the forward or right hand end of piston 22 will likewise assert an impulse to start movement of the pistons toward the left end, and when the ports 38 are exposed by the piston heads in their rearward movement, the force of the compressed fluid in the respective cylinders escaping through the ports 38 will cause the valve disc 34 to snap over to seat on valve box 6 closing passage 33. The pressure fluid will then pass from the valve chamber 31 through passages 32, 36 and into the ports 38 to accelerate movement of the piston heads toward the left, as previously explained.

Because of the difference in the sizes of the piston stems 17, 18 and 19, the latter being the smallest, piston 22, to which it is connected will have a larger area on the righthand or stem end than the pistons 21 and 20, thereby tending to accelerate piston 22 which functions to maintain effective contact of the piston heads and stems in their movement to the left, as viewed in the drawings. It is therefore seen that the multiple piston hammers act as an integral unit and could be integrally connected without altering the operation of the device.

It is evident from the foregoing description of the invention that the arrangement of tandem cylinders and piston hammers in conjunction with a single operating valve with the porting of the tandem cylinders, as described, provides a simple, durable rock drill structure with a simple method of attaching the drill in a manner to permit hammer motion without striking the drill bit. This end motion of the drill bit allows forward travel of the bit when it does not bottom in the hole in which it is drilling, and in the drilling operation it is essential that the drill bit has a certain amount of free end motion because when the piston hammers strike blows on the drill bit it must be free to travel forward to allow the cutting edges to penetrate the rock. This permits the force of the blows to be transmitted through the drill bit to the cutting edges where it is spent in the rock—otherwise the machine proper would absorb the force of the blows.

The other important purpose of the free-floating chuck is when lowering into or pulling out of the hole, as in the case when removing or adding drill pipe lengths to the string, is to have the piston hammers operating so as to set up vibrations in the drill pipe, making it easier to remove or enter into a hole that is not clear of rock cuttings or when small rocks or particles fall into the hole. Naturally it is not necessary and would cause undue stress on the machine if the piston hammers would be striking blows on the drill bit during this part of the drilling cycle. Therefore, the drill bit moves forward or away from the striking point of the piston hammers when it is not held down on the rock.

Also, true synchronization by use of differential areas of the piston hammers is possible by the porting arrangement of the multiple piston cylinders in which the pressures equalize because of the fact that air expands equally in all directions and pressure cannot increase or decrease in one cylinder before the others.

The compression force in the rear cylinder by the piston hammer action forces the valve from its seat and actually pushes back the air through the supply port, causing a pulsation at the end of each stroke due to the cushion of air that stops and starts piston hammers on reverse action. The forward stroke is similar to rearward, except that each blow upon the drill bit stops the piston hammers and the compression force in the front cylinder chamber reverses piston hammer action.

The high pressure air entering the drill insures high velocity of the piston hammers to strike blows of great force and when exhausted from cylinders will expand and drop in pressure so that a large volume of air is available to blow the rock cuttings from the drilled hole.

Although one embodiment of the invention has been herein illustrated and described, it will be evident to those skilled in the art that various modifications may be made in the details of construction without departing from the principles herein set forth.

I claim:

1. In a pneumatic piston operated device, a cylinder housing divided into a plurality of cylinder chambers, a plurality of piston hammers disposed in said cylinder chambers with the ends of the pistons in abutting engagement, a reciprocating member at one end of said cylinder housing adapted for engagement by the end piston hammer, the other end of said cylinder housing being provided with means for positioning the unit in relation to the work to be acted upon, said means having an air flow passage leading to a supply of fluid pressure, and said cylinder housing having ported passages communicating with said air flow passage and with the cylinder chambers on opposite sides of the piston hammers, and a valve disposed between said pressure source and the cylinder ported passages to direct fluid pressure from the source alternately to opposite sides of the piston hammers.

2. In a pneumatic piston operated device, a cylinder housing divided into a plurality of cylinder chambers, a plurality of piston hammers disposed in said cylinder chambers with the ends of the pistons in abutting engagement, a reciprocating member at one end of said cylinder housing adapted for engagement by the end piston hammer, the other end of said cylinder housing being provided with means for positioning the unit in relation to the work to be acted upon, said means having an air flow passage leading to a supply of fluid pressure, and said cylinder housing having ported passages communicating with said air flow passage and with the cylinder chambers on opposite sides of the piston hammers, and a valve disposed between said pressure source and the cylinder ported passages to direct fluid pressure from the source alternately to opposite sides of the piston hammers, said valve being operated in its flow controlling movements by the fluid pressure from the source and the compression force of the piston hammers in their reciprocating movement.

3. A pneumatic piston operated device as set forth in claim 1, in which the piston hammers consist of piston heads having shanks extending through and in sliding engagement with the partitions dividing the cylinder housing into cylinder chambers, the ends of which abut the heads of adjacent pistons, the shanks of adjacent piston hammers being of graduated diameters to provide graduated piston areas on the shank side of the piston hammers diminishing in size from the working end to the attaching end of the unit, whereby in both directions of reciprocatory movement of the piston hammers the end pistons are of maximum area to accelerate the piston travel of the end piston hammers in the direction of movement whereby perfect synchronism of the piston hammer movement is obtained.

4. A pneumatic piston operated device as set forth in claim 1 in which the cylinder chambers are provided with vent openings disposed in the path of travel of the piston hammers to exhaust pressure from the cylinder chambers at the beginning of the return strokes of the piston hammers, said vent holes being sealed by the piston hammers after the return strokes have been initiated to compress the fluid remaining in said cylinder chambers to unseat the valve, the degree of compression being in excess of the pressure of the fluid source to cause a pulsation to stop further movement and reverse the piston hammers.

References Cited in the file of this patent

UNITED STATES PATENTS

| | | |
|---|---|---|
| 1,612,779 | Mercer | Dec. 28, 1926 |
| 1,774,572 | Smith | Sept. 2, 1930 |
| 1,874,130 | Smickle | Aug. 30, 1932 |
| 2,665,136 | Fallon | Jan. 5, 1954 |
| 2,669,840 | Joy | Feb. 23, 1954 |
| 2,681,805 | Parker et al. | June 22, 1954 |
| 2,714,370 | Jeschke | Aug. 2, 1955 |
| 2,810,549 | Morrison | Oct. 22, 1957 |
| 2,851,251 | Mori | Sept. 9, 1958 |